United States Patent
Glebov et al.

(10) Patent No.: US 12,405,482 B2
(45) Date of Patent: Sep. 2, 2025

(54) ACHROMATIC HOLOGRAPHIC PHASE MASKS

(71) Applicant: IPG PHOTONICS CORPORATION, Oxford, MA (US)

(72) Inventors: Leonid Glebov, Oviedo, FL (US); Ivan Divliansky, Orlando, FL (US); Oussama Mhibik, Oviedo, FL (US); Vadim Smirnov, Orlando, FL (US)

(73) Assignee: IPG PHOTONICS CORPORATION, Malborough, MA (US)

( * ) Notice: Subject to any disclaimer, the term of this patent is extended or adjusted under 35 U.S.C. 154(b) by 557 days.

(21) Appl. No.: 17/796,705

(22) PCT Filed: Feb. 4, 2021

(86) PCT No.: PCT/US2021/016588
§ 371 (c)(1),
(2) Date: Aug. 1, 2022

(87) PCT Pub. No.: WO2021/158774
PCT Pub. Date: Aug. 12, 2021

(65) Prior Publication Data
US 2023/0062015 A1    Mar. 2, 2023

Related U.S. Application Data

(60) Provisional application No. 62/970,001, filed on Feb. 4, 2020.

(51) Int. Cl.
*G03H 1/02*    (2006.01)
*G02B 27/42*   (2006.01)
(Continued)

(52) U.S. Cl.
CPC ....... *G02B 27/4277* (2013.01); *G03H 1/0248* (2013.01); *G03H 1/10* (2013.01);
(Continued)

(58) Field of Classification Search
CPC ........ G02B 27/4277; G02B 5/32; G02B 5/18; G02B 2005/1804; G02B 5/1814;
(Continued)

(56) References Cited

U.S. PATENT DOCUMENTS 6,314,220 B1*  11/2001  Mossberg .............. G02B 27/46
                                                      359/569
2003/0138207 A1*  7/2003  Wang .................. G02B 6/02138
                                                      385/37
(Continued)

*Primary Examiner* — Arnel C Lavarias
(74) *Attorney, Agent, or Firm* — Caroline J. Roush, Esq.

(57) ABSTRACT

A method includes selecting a period for a volume Bragg grating (VBG) such that a spectral selectivity of the VBG is at least as wide as a spectral width of a broadband light beam that is to be spatially transformed, selecting a desired beam transformation for the broadband light beam, passing a first light beam from a recording light source through an optical device to a volume holographic recording medium where the optical device is configured to induce the desired beam transformation, directing a second light beam from the recording light source to the recording medium, and converging the first light beam and the second beam at a recording angle such that a spatial refractive index modulation profile is recorded in the recording medium that provides the VBG with the selected period, and a phase profile is embedded in the VBG that induces the desired beam transformation for each spectral component within a spectral width of the VBG.

20 Claims, 5 Drawing Sheets

(51) Int. Cl.
*G03H 1/10* (2006.01)
*G11B 7/1353* (2012.01)
*G11B 7/1395* (2012.01)

(52) U.S. Cl.
CPC ... *G11B 7/1353* (2013.01); *G03H 2001/0216* (2013.01); *G03H 2223/13* (2013.01); *G11B 7/1395* (2013.01)

(58) Field of Classification Search
CPC .. G02B 5/1819; G02B 5/1823; G02B 5/1847; G02B 5/1857; G02B 5/1861; G02B 5/1866; G02B 5/1871; G02B 27/42; G02B 27/425; G02B 27/4272; G02B 27/4288; G11B 7/1353; G11B 7/1395; G11B 7/1362; G11B 7/1367; G03H 1/0248; G03H 1/10; G03H 2001/0216; G03H 2223/13; G03H 1/00; G03H 1/02; G03H 2001/0204; G03H 2001/0212; G03H 2001/0208; G03H 2001/0268; G03H 1/04; G03H 1/0402; G03H 1/0406; G03H 1/041; G03H 2001/0413; G03H 2001/0415; G03H 1/0465; G03H 2001/0471; G03H 2001/0473; G03H 1/2286; G03H 2001/2289; G03H 2210/00; G03H 2210/10; G03H 2210/12; G03H 2222/00; G03H 2222/10; G03H 2222/12; G03H 2223/00; G03H 2260/00
USPC ...... 359/11, 1, 3, 10, 15, 21, 27, 28, 32, 33, 359/35, 558, 566, 569, 571, 572, 573, 359/575, 576; 430/1, 2
See application file for complete search history.

(56) References Cited

U.S. PATENT DOCUMENTS

| | | | |
|---|---|---|---|
| 2006/0066930 A1* | 3/2006 | Dubois | G11B 7/00772 |
| 2008/0080585 A1* | 4/2008 | Glebov | H01S 3/08045 |
| | | | 372/102 |
| 2009/0161519 A1* | 6/2009 | Yamamoto | G11B 7/128 |
| 2016/0116656 A1* | 4/2016 | Glebov | G03H 1/04 |
| | | | 359/3 |
| 2017/0153373 A1* | 6/2017 | Divliansky | G02B 6/34 |
| 2019/0324181 A1* | 10/2019 | Glebov | G02B 5/1871 |

* cited by examiner

ACHROMATIC HOLOGRAPHIC PHASE MASKS

RELATED APPLICATIONS

This application claims priority under 35 U.S.C. § 119(e) to U.S. Provisional Application Ser. No. 62/970,001, titled ACHROMATIC BROADBAND HOLOGRAPHIC PHASE MASKS, filed on Feb. 4, 2020, which is herein incorporated by reference in its entirety.

BACKGROUND

Technical Field

The technical field relates generally to optical phase masks, and more specifically to monolithic achromatic holographic phase masks for broadband laser beam applications.

Background Discussion

Ultrafast femtosecond lasers and CW high power laser systems are widely used in the fields of science and technology. Their development and growth has led to applications such as high-precision micro-machining, industrial processing, ultra-fast detection, biology, medicine, and material processing. However, due to the large spectral bandwidth necessary for creating short pulses or to manage nonlinear effects in the case of high power fiber lasers, it is quite difficult to manipulate their transverse mode structure. Conventionally, phase masks have been used to convert laser mode structures, but they are inherently monochromatic and are therefore conventionally limited to monochromatic systems.

SUMMARY

Aspects and embodiments are generally in the field of achromatic phase masks that include a holographically encoded phase profile inside a volume Bragg grating.

In a method in accordance with the present invention, the method includes selecting a period for a volume Bragg grating (VBG) such that a spectral selectivity of the VBG is at least as wide as a spectral width of a broadband light beam that is to be spatially transformed, selecting a desired beam transformation for the broadband light beam, passing a first light beam from a recording light source through an optical device to a volume holographic recording medium, the recording light source emitting light at a recording wavelength that is within a photosensitivity spectrum of the volume holographic recording medium, and the optical device configured to induce the desired beam transformation, directing a second light beam from the recording light source to the volume holographic recording medium, and converging the first light beam and the second beam at a recording angle such that: a spatial refractive index modulation profile is recorded in the volume holographic recording medium that provides the VBG with the selected period, and a phase profile is embedded in the VBG that induces the desired beam transformation for each spectral component within a spectral width of the VBG. According to one embodiment, an optical device is created using this method.

According to one embodiment, the spectral width of the broadband light beam is at least 5 nm. According to another embodiment, the spectral selectivity of the VBG is wider than that of the broadband light beam.

According to one embodiment, the desired beam transformation includes introducing a phase shift function. According to another embodiment, the phase shift function produces mode conversion.

According to one embodiment, the method further includes splitting the recording light emitted from the light source into the first light beam and the second light beam.

According to another embodiment, the method further includes deflecting the first and second light beams such that the first and second light beams converge at the recording angle.

According to another embodiment, the optical device is configured to provide the desired beam transformation at the recording wavelength.

According to one embodiment, the method further includes obtaining the optical device.

According to another embodiment, the method further includes selecting a thickness for the VBG such that the spectral selectivity of the VBG is at least as wide as the spectral width of the broadband light beam.

In a system in accordance with the invention, the system includes a light source that emits a collimated recording light beam at a recording wavelength, a beam splitter configured to split the recording light emitted from the light source into a first beam and a second beam, the first beam directed along a first beam path and the second beam directed along a second beam path, an optical device disposed in the first beam path, the optical device configured to induce a desired beam transformation for a broadband light beam that is to be transformed, at least one mirror configured to deflect at least one of the first and second light beams such that the first and second light beams converge at a recording angle, and a volume holographic recording medium having a photosensitivity to the recording wavelength and disposed at an intersection of the first and second beam paths, wherein the convergence of the first and second light beams records a spatial refractive index modulation profile in the volume holographic recording medium so as to create a volume Bragg grating (VBG) having a period such that a spectral selectivity of the VBG is at least as wide as a spectral width of the broadband light beam, and a phase profile is embedded in the VBG that induces the desired beam transformation for each spectral component within a spectral width of the VBG.

According to one embodiment, a center wavelength of the broadband light beam is within a wavelength range of 325 nm to 2700 nm.

According to another embodiment, the volume holographic recording medium is photo-thermo-refractive (PTR) glass.

According to another embodiment, the volume holographic recording medium is monolithic in structure.

According to another embodiment, the volume holographic recording medium has a thickness such that the spectral selectivity of the VBG is at least as wide as the spectral width of the broadband light beam.

According to another embodiment, the broadband light beam has a center wavelength that is transparent to the volume holographic recording medium.

In another method in accordance with the invention, a method of hologram recording is provided. The method includes selecting a period and thickness for a volume Bragg grating (VBG) such that a spectral selectivity of the VBG is at least as wide as a spectral width of a broadband light beam that is to be spatially transformed, selecting a desired beam transformation and corresponding phase profile across an aperture for the broadband light beam, selecting a recording light source emitting light at a recording wavelength that is within a photosensitivity spectrum of a volume holographic recording medium, designing and fabricating a phase mask or spatial light modulator that provides a desirable phase profile at a wavelength of a recording light source, splitting a beam from the recording light source into two recording beams, aligning a hologram recording system to provide a convergence angle between the two recording beams that provides the selected period of the VBG, passing a first recording light beam from the recording light source through a phase mask or a spatial light modulator to a volume holographic recording medium to create a first light beam path with the desirable phase profile across the aperture, directing a second recording light beam from the recording light source to the volume holographic recording medium to create a second light beam path, converging the first light beam and the second beam at the convergence angle such that: a spatial refractive index modulation profile is recorded in the volume holographic recording medium that provides the VBG with the selected period, and a phase profile is embedded in the beam diffracted by the VBG that induces the desired beam transformation, which is identical for each spectral component of the broadband beam within the broadband spectral width of the VBG.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments," "certain embodiments," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
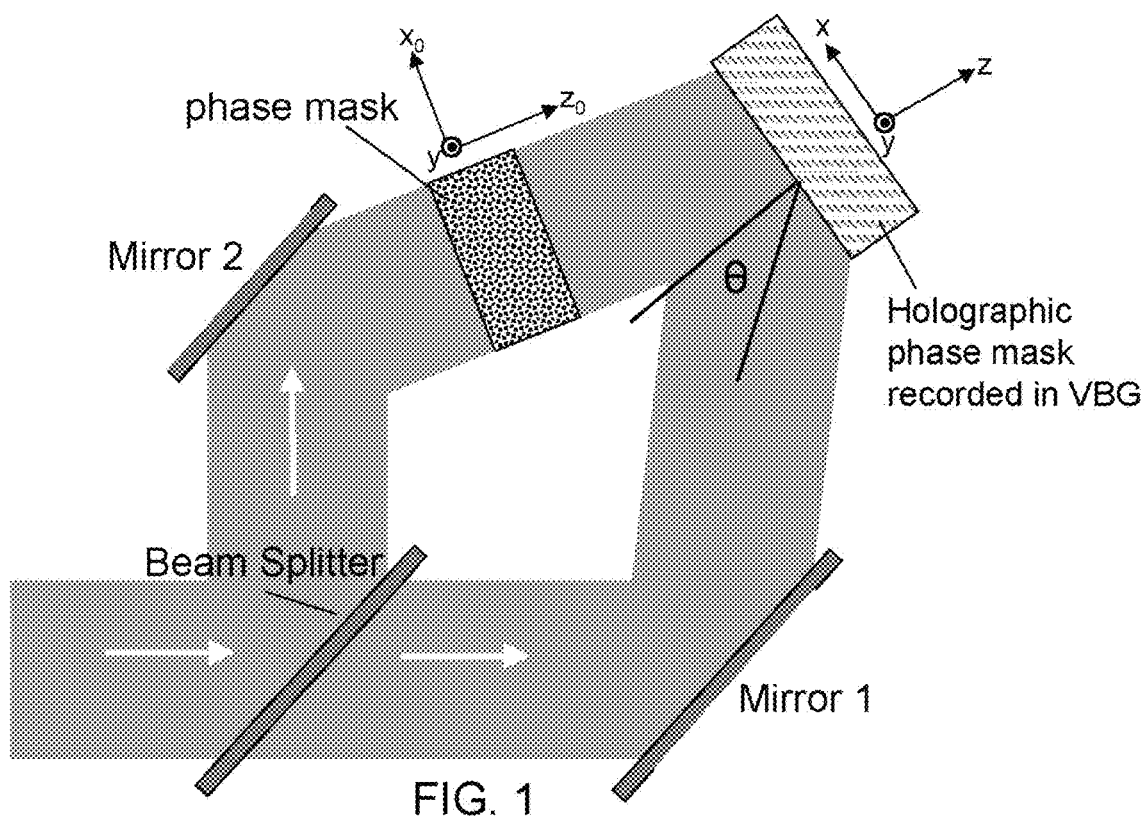
FIG. 1 is a schematic representation of a two beam holographic optical setup for creating a volume holographic phase mask in a recording medium.

A hologram is produced by a recording in a two- or three-dimensional medium of the interference pattern created by the interaction of two coherent light fields (typically called the reference and object beams), rather than of an image formed by a lens. The hologram contains both the amplitude and relative phase of the light fields as opposed to a photograph that contains only the intensity of the recorded light field. In situations where there is interference of collimated coherent beams, the developed hologram works as a diffraction volume Bragg grating (VBG). When the VBG is illuminated by a reference beam that satisfies the Bragg condition, it generates a diffracted beam that contains the exact wavefront of the incident beam. The features of diffraction from a hologram depend on the thickness of the recording medium. A thin hologram is one where the thickness of the recording medium is much less than the spacing of the interference fringes that make up the holographic recording. In a thin hologram, light scatters into multiple orders where each order corresponds to a particular angle. A thick or volume hologram is one where the thickness of the recording medium is greater than the spacing of the fringes of the interference pattern. In this three dimensional structure, which can be referred to as a volume holographic structure, light scatters into only one diffraction order. This diffraction of light is governed by the Bragg Equation:

$$2n\Lambda \sin(\theta+\phi)=\lambda$$

where n is a refractive index of the recording medium, $\lambda$ is the wavelength, $\Lambda$ is the period of the grating, $\theta$ is the angle between the incident beam and the normal, and $\phi$ is the angle between the normal and the grating vector.

When used in a transmission mode, a conventional VBG is a narrowband device that shows the strong dependence of a diffraction angle on the operating wavelength. The spectral acceptance of typical transmitting VBGs do not exceed a few nanometers, which makes it difficult to design achromatic optical systems using these structures.

A phase mask is an optical element that produces transformation of optical beams from one mode (e.g. Gaussian beam) to another (e.g. doughnut). A phase mask has different optical thicknesses (product of geometrical thickness and refractive index $I_{opt}=I_g \times n$) at different areas of an aperture. This effect can be achieved by spatial profiling of geometrical thickness or refractive index. A particular beam transformation is determined by a spatial profile of phase incursion of a transmitted beam. Phase incursion (φ) is determined by optical thickness divided by wavelength:

$$\varphi = \frac{2\pi \Delta n l_g}{\lambda}$$

Therefore, a phase mask with a specified spatial profile of optical thickness $l_{opt}$ produces a specified beam transformation for a specified wavelength only. It is a monochromatic operating system within tolerance of phase incursion errors.

A holographically encoded stepped or grey level phase mask profile can be encoded inside a transmitting VBG and is referred to as a holographic phase mask (HPM). Contrary to conventional VBGs, HPMs are fabricated by the interference of coherent beams with specific phase profiles across their apertures. HPMs provide diffraction of an incident beam (as a conventional VBG) if the angle of incidence corresponds to the Bragg angle for a given wavelength. However, a phase profile of the diffracted beam across its aperture is determined by a phase profile in the recording beam. The HPM is a narrowband device because it operates only within spectral acceptance of the corresponding VBG. However, contrary to a conventional phase mask, an HPM can be used at different wavelengths if it is angularly tuned in order to meet the corresponding Bragg condition for the VBG.

It is well known that complex holograms possess high chromatism and can be reconstructed only at the same wavelength that was used for recording. However, it is an inherent property of uniform VBGs (trivial holograms produced by interference of collimated beams) that by proper choice of incident angle and wavelength for a given period of a VBG, diffraction can be obtained for different wavelengths. Therefore, while the VBG is a narrowband device, it is spectrally tunable by changing the incident angles to satisfy the Bragg condition for different wavelengths. For a holographic mask, different parts of the VBG provide different phase incursion for a beam diffracted by the HPM. Because a phase shift between different parts of the VBG does not depend on wavelength, the HPM is automatically configured such that phase incursion measured in wavelengths is the same for different wavelengths. Therefore, upon diffraction, the diffracted beam acquires the same phase profile as if going through a simple phase mask suitable for this particular wavelength. HPMs embedded in VBGs are narrowband but tunable and can operate at any wavelength that satisfies the Bragg condition for the recorded VBG because the incoming angle of a beam can be adjusted with a particular wavelength to meet the Bragg condition for the recorded VBG.

Figure 1A:
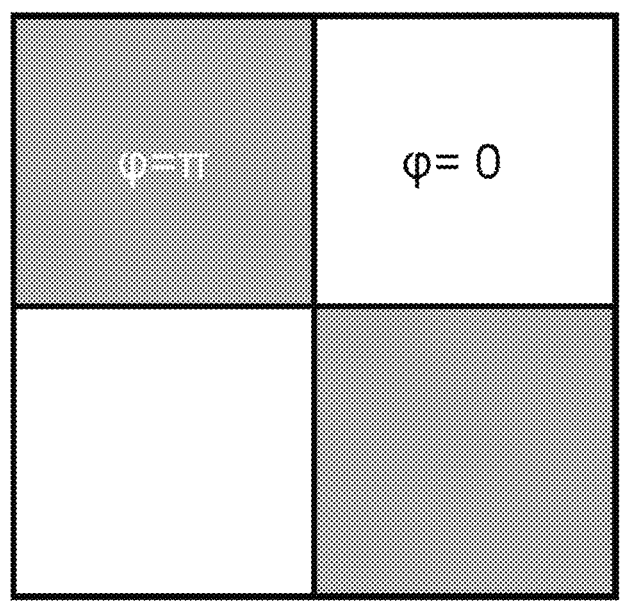
FIG. 1A is an example of a four-sector binary phase profile.

The encoding of a phase profile into a VBG can be carried out using the holographic setup shown in FIG. 1, as described in U.S. patent application Ser. No. 14/521,852, which is hereby incorporated by reference. In this setup, a phase mask (see as one example, a standard binary mask shown in FIG. 1A) is placed into one of the arms (object beam) of a two-beam recording system. The phase mask is configured with the desired phase transitions for the hologram recording wavelength and not for the reconstructing wavelength. The beams interfere at an angle θ relative to the normal of the sample to create a fringe pattern inside the sample according to the following equation:

$$I = I_1 + I_2 + 2\sqrt{I_1 I_2} \cos(((\vec{k_1} - \vec{k_2}) \cdot \vec{r} + \phi(x,y,z)),$$

where I is the intensity, $\vec{k_1}$ is the wavevector for each beam, and φ is the phase change introduced by the phase mask after the object beam has propagated to the recording material. The recorded hologram will have a refractive index profile described by:

$$n(x,y,z) = n_0 + n_1 \cos(\vec{K} \cdot \vec{r} + \phi(x,y)),$$

where $n_0$ is the average refractive index, $n_i$ is the refractive index spatial modulation, and $\vec{K} = \vec{k_1} - \vec{k_2}$ is the grating vector. Using this approach, a hologram can be recorded and placed in a system with some probe beam to be diffracted, which may or may not have the same wavelength as the recording beam.

Figure 2:
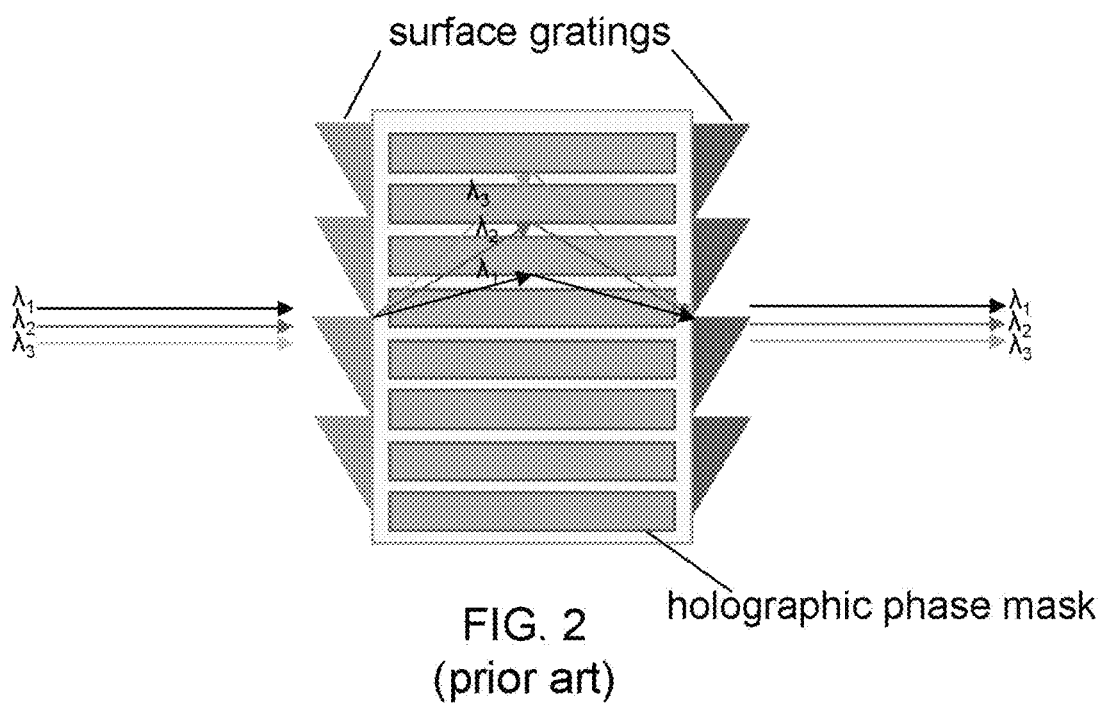
FIG. 2 is a schematic representation of a prior art achromatic holographic phase mask.

Although HPMs can be angularly tuned to phase transform the wavefront of beams with different wavelengths, the spectral width of a beam with a specific wavelength is narrow. HPMs can successfully imprint their phase pattern as long as the wavelength satisfies the Bragg condition but to achieve this, the HPM needs to be angle tuned which cannot be considered pure achromatization. Such achromatization of HPMs can be accomplished with the concept of pairing the Bragg grating with two surface gratings, as shown in FIG. 2 and described in U.S. Pat. No. 9,778,404, which is hereby incorporated by reference. According to the grating dispersion equation below, a surface grating with a given period ($\Lambda_{SG}$) will diffract normally incident light at an angle (θ) (diffracted angle) as a function of its wavelength (λ), and m is the order of diffraction:

$$\Lambda_{SG} \sin \theta = m\lambda$$

Based on coupled wave theory, a VBG will diffract light if the Bragg condition below is met:

$$2\Lambda_{VBG} \sin \theta_B = \lambda$$

where $\Lambda_{VBG}$ is the VBG's grating period, $\theta_B$ is the Bragg angle, and λ is the incident wavelength.

Since both of the diffraction angles are dependent on the corresponding grating periods, if the surface grating period is double the period of the VBG, then any first-order diffraction by normally incident light will be at the corresponding Bragg condition of the VBG and that will hold for any wavelength:

$$2\Lambda_{VBG} = \Lambda_{SG}$$

Therefore, a surface grating with twice the period of a TBG can make different wavelengths get diffracted by the TBG at the same time as long as they have the same incident angle. In order to recollimate the diffracted beams, an identical surface grating is added in a mirror orientation to the transmitting VBG, as indicated in FIG. 2. This second grating completely cancels out the dispersion of the first surface grating and recollimates the outgoing beam. Applying this concept to an HPM eliminates the need for angle tuning in order to meet the Bragg condition for different wavelengths, making, therefore, the device a fully achromatic phase element. When the two gratings satisfy the above condition, the first order diffracted angle from the surface grating will match the Bragg condition for the VBG for all wavelengths. This results in increased diffracted spectral bandwidth and overall diffraction efficiency for sources with a bandwidth larger than the VBG's spectral selectivity by orders of magnitude.

While the surface and volume grating combination shown in FIG. 2 makes the HPM achromatic, it also makes the device a multi-component device, which not only complicates the system but also requires precise alignment. The system and method described herein provide a way to expand the wavelength acceptance of HPMs and make them capable of operating over a broadband spectral range without the addition of any other optical elements such as surface or volume gratings, lenses, mirrors, prisms, etc. This is accomplished by a specific holographic recording of the HPM that enables achievement of specific parameters of VBGs required for broadband operation. As a premise, for a predetermined spectral width of a source of probe radiation (i.e., a broadband source), a period of a VBG should be selected in such a manner that the VBG's spectral selectivity matches the spectral width of the source, i.e., the broadband light beam that is to be transformed. For an HPM embedded in such a VBG, phase incursions for all spectral components within the spectral width of the VBG are the same if measured in wavelengths. This means that the HPM is achromatic within the spectral width of the VBG and can be used for beam transformations of broadband light sources. Thus, the diffracted beam would have a phase profile across its aperture corresponding to the phase distribution of the master phase mask present in an arm of the recording setup, as described herein.

An additional feature of the HPMs is that it is possible to record several holograms in the same volume of a photosensitive medium. It is known that several VBGs can be recorded in the same volume of a photosensitive medium. While those multiple gratings physically intersect each other in the same volume, they are optically independent. This feature is transferred to the HPM. While multiple HPMs are in the same volume, the desired beam transformation (e.g. phase incursion) can be obtained only in a beam diffracted by a particular VBG. Thus, HPMs imprinted in VBGs with a broad spectral selectivity possess two features impossible for conventional phase masks—they are achromatic within a spectral acceptance of the VBG, and they can be multiplexed within the same volume of photosensitive recording medium. The disclosed systems and methods provide a single monolithic optical element that applies identical phase transformations for each wavelength, i.e., each spectral component of the broadband beam within the spectral selectivity of the VBG. It is also easy to manufacture without the need of expensive precision thickness measurements or birefringent crystal structures.

Figure 3:
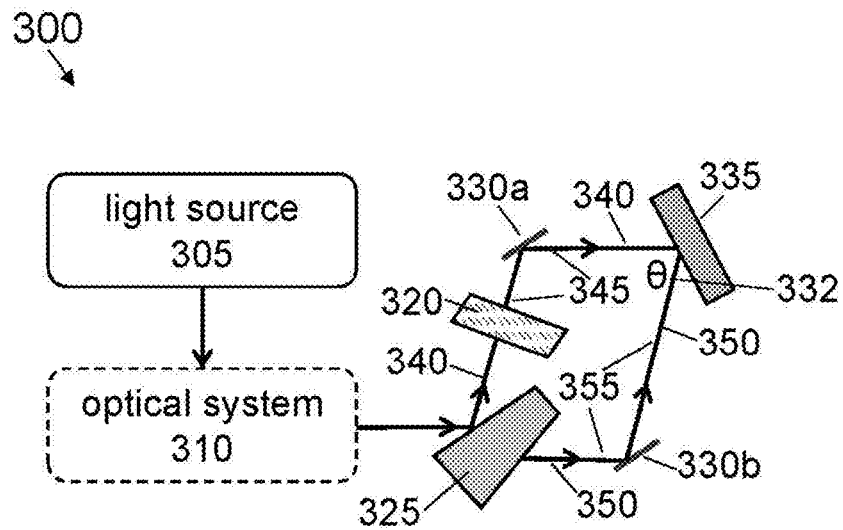
FIG. 3 is a schematic representation of one example of a system for recording an achromatic volume holographic phase mask in accordance with aspects of the invention.

In accordance with at least one embodiment, a system for recording an achromatic volume holographic phase mask is generally shown at 300 in FIG. 3. The system 300 includes a light source 305, a beam splitter 325, a phase mask 320, at least one mirror 330, and a volume holographic recording medium 335. In brief, the light source 305 generates recording light that is sent to the beam splitter 325 and the two emerging beams are then redirected to the recording plane, i.e., the volume holographic recording medium 335 where they converge at a recording angle θ, indicated generally at 332.

The set-up of system 300 is configured to produce an achromatic phase mask that includes a holographically encoded phase profile inside a VBG. The resulting optical device is configured with desired optical properties. For one thing, a period of the VBG (a specified period of an interference pattern formed in a plane of intersection between the two light beams) is selected and then implemented into the device such that a spectral selectivity of the VBG is at least as wide as that of a broadband light beam that is to be spatially transformed that is to be used in combination with the resulting optical device, i.e., transmitted/diffracted through the optical device. The broadband light beam can have a spectral width that is at least 5 nm and can range from 5 to 20 nm. In accordance with at least one aspect, the broadband light beam has a center wavelength that is transparent to the volume holographic recording medium 335 or is otherwise within a window of transparency to the volume holographic recording medium 335. Sources of such broadband light beams include ultrashort pulse lasers and high power CW lasers. The period of this VBG is therefore quite wide, i.e., a long period transmitting VBG. In addition, a desired beam transformation for the broadband light beam is selected that is to be induced by the phase mask 320. The phase mask is therefore designed and fabricated to provide the desirable beam transformation at the recording wavelength. The phase mask information is embedded in the VBG and it provides the same beam transformation for all spectral components of a broadband probe beam. In some instances, the beam transformation includes introducing a phase shift function. As discussed in the example below, the phase shift function can produce mode conversion.

The light source 305 (also referred to herein as a recording light source) emits a recording light beam. In one embodiment, the light source emits a collimated recording light beam at a recording wavelength that is within a photosensitivity spectrum of the volume holographic recording medium 335. According to some embodiments, the light source 305 can be configured to output ultraviolet (UV) light in a wavelength range that corresponds to the photosensitivity of PTR glass, and in at least one embodiment is in a wavelength range of 250 nm to 400 nm. In some embodiments, the light source 305 is a HeCd laser emitting light at a wavelength of 325 nm. Other laser light sources are also within the scope of this disclosure, including fiber laser sources or systems configured to emit UV light. Furthermore, for other photosensitive materials besides PTR glass, laser sources configured to emit wavelengths within the respective photosensitive spectrum of these materials may also be used. The laser light source may be configured as continuous wave (CW) or quasi-continuous wave (QCW).

The beam splitter 325 splits the recording light emitted from the light source 305 into a first beam 340 (also referred to as an object beam) and a second beam 350 (also referred to as a reference beam, and is understood to be coherent). The first beam 340 is directed along a first beam path 345 and the second beam 350 is directed along a second beam path 355. The beam splitter 325 may be, for example, a half mirror where about 50% of the incident light is transmitted to the first beam path 345 (or second beam path 355) and about 50% of the incident light is reflected to the second beam path 355 (or first beam path 345). However, the ratio at which the incident light is divided into the first beam 340 and second beam 350 is just an example, and the ratio may be differently set.

System 300 also includes at least one mirror 330, such as mirrors 330a, 330b disposed in at least one of the first beam path 345 and the second beam path 355. The at least one mirror is configured to deflect at least one of the first and second light beams 340, 350 such that the first and second light beams 340, 350 converge at a recording angle θ 332. According to one embodiment, mirrors 330a and 330b are installed on rotary stages, allowing the angle 332 to be controlled. At least one of mirrors 330a and 330b may be configured to be rotatable and movable so that the associated beam is incident on a desired position of the volume holographic recording medium 335, or that a cross-section of either beam is positioned in relation to a cross-section of the other beam in a desired fashion.

The at least one mirror 330 is configured such that the first and second light beams 340, 350 converge at the recording angle θ 332 (also referred to as a convergence angle) that creates or otherwise dictates the desired period for the resulting VBG that is recorded in the volume holographic recording medium 335 and generated by the interference pattern between the converging/intersecting first and second light beams. As stated before, this period is selected such that a spectral selectivity of the VBG is at least as wide as a spectral width of a broadband light beam that is to be transformed. In addition, the volume holographic recording medium 335 is configured or otherwise provided with a thickness that can accommodate this condition. In certain instances, the spectral width of the (transmitting) VBG with such long periods can reach tens of nanometers. For example, in some embodiments the spectral width of the VBG is at least 30 nm, and in some instances may be at least 100 nm. Such a transmitting VBG can diffract broadband radiation with high efficiency. According to at least one embodiment, the spectral selectivity of the VBG is wider than that of the broadband light beam that is to be transformed.

The phase mask 320 is disposed in the first beam path 345, and the volume holographic recording medium 335 is disposed at an intersection of the first and second beam paths 345 and 355. The phase mask 320 may be positioned between the beam splitter 325 and the volume holographic recording medium 335 and phase modulates the first beam 340 prior to reaching the volume holographic recording medium 335. Although the examples described herein include a phase mask, it is to be appreciated that in alternative embodiments other options such as a spatial light modulator (SLM) could also be used to induce the same effect.

In a broader sense, the volume holographic recording medium 335 can be any (transparent) material that is capable of changing refractive index after exposure to optical radiation. The volume holographic recording medium 335 may therefore be constructed from a photosensitive media such as photo-thermo-refractive (PTR) glass, PTR glass is a sodium-potassium-zinc-aluminum-fluorine-bromine-silicate glass doped with cerium, antimony, tin, and silver, with a region of transparency from 350 nm to 2700 nm and a laser damage threshold for 10 ns pulses of 40 J/cm$^2$. Besides the wide transparency region and high damage threshold, PTR glass also has a low absorption, which are all properties that make it a highly suitable substrate for high power laser systems. PTR glass is photosensitive in the near UV spectral region. Other types of recording materials are also within the scope of this disclosure, non-limiting examples of which include dichromated gelatins, photopolymers, and photorefractive crystals.

Figure 7:
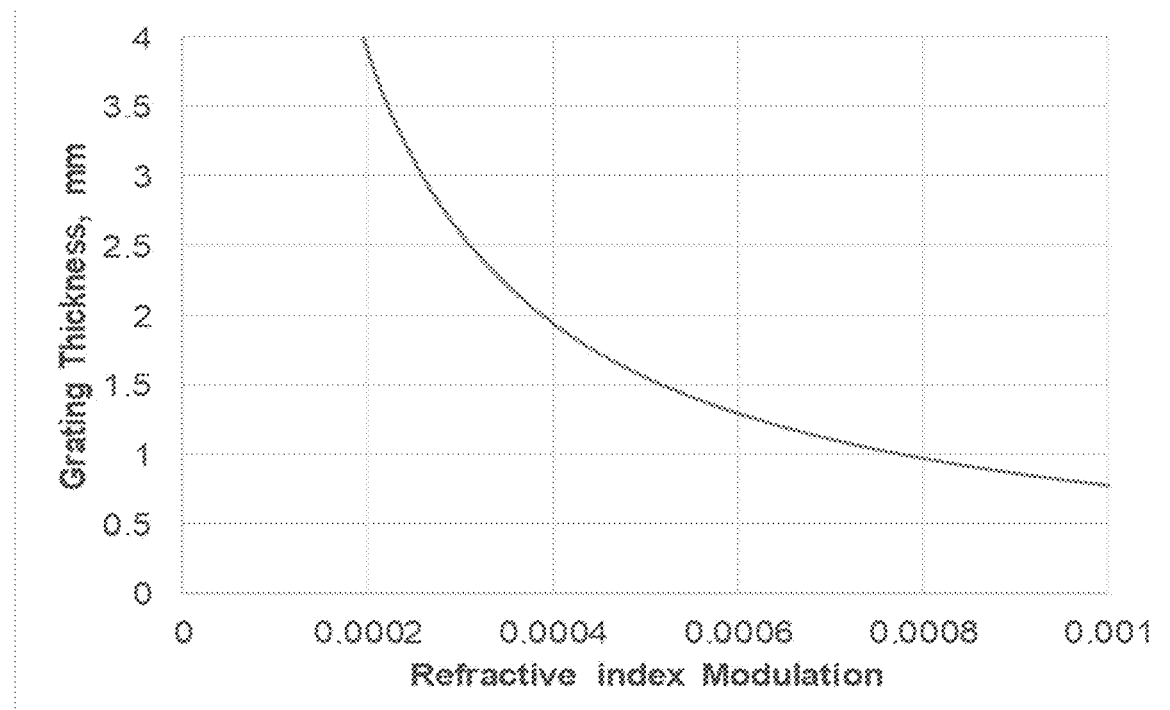
FIG. 7 is a plot showing the dependence of a volume holographic recording medium thickness required for 100% diffraction efficiency on refractive index modulation in accordance with aspects of the invention.
Figure 8:
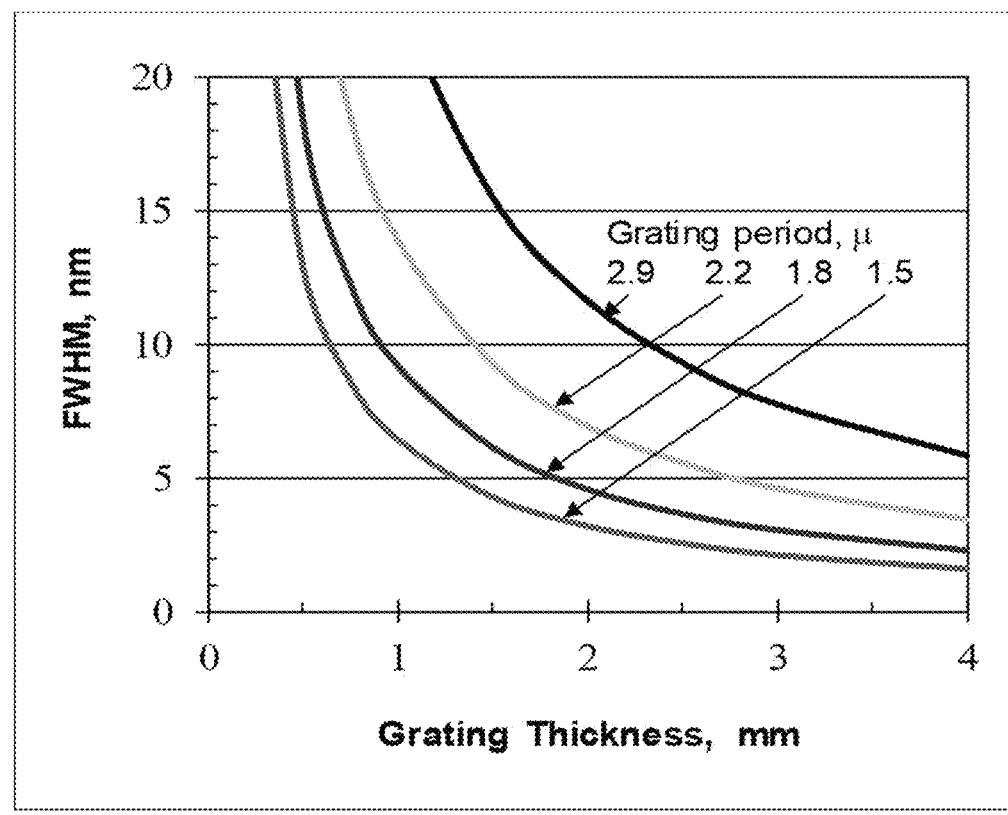
FIG. 8 is a plot showing the dependence of spectral selectivity (FWHM) of a transmitting volume Bragg grating recorded in the volume holographic recording medium of FIG. 7 on thickness for different grating periods.

It is to be appreciated that the system and method described herein can be applied to applications that use ultrashort pulse lasers and high power CW lasers. For instance, lasers used for material processing include ultrashort pulse lasers and high power CW lasers that each have a spectral width in a range from 5 to 20 nm. The power density for ultrashort pulse lasers can exceed $10^9$ W/cm$^2$, and the power density for CW lasers can exceed 10 kW/cm$^2$. One non-limiting example of a material that can tolerate such power densities is PTR glass. However, spectral refractive index modulation is within $10^{-3}$ (1000 ppm) or more in this material, which means that in order to record high efficiency VBGs in this material, the VBGs need to have a large thickness. The dependence of PTR glass grating thickness required for 100% diffraction efficiency on refractive index modulation is shown in FIG. 7 (λ=1550 nm, n=1.495). The results in FIG. 7 indicate that it is necessary to provide a VBG thickness exceeding 1 mm to record a high efficiency VBGs. The dependence of the spectral width (FWHM) or selectivity of transmitting VBGs recorded in PTR glass on thickness for different grating periods is shown in FIG. 8 (λ=1550 nm, n=1.495). The results in FIG. 8 indicate that even for VBGs having a thickness of several millimeters, spectral selectivity above 5 nm could be achieved for grating periods of several microns.

The volume holographic recording medium 335 is constructed from a thick (i.e., on the order of several mm) piece of volume phase photosensitive material and is disposed at an intersection (plane of intersection) or convergence of the first and second beam paths 345 and 355. The first beam 340 and the second beam 350 encounter one another in the volume holographic recording medium 335 and generate interference fringes. These fringes are recorded in the volume holographic recording medium 335 as a spatial refractive index modulation profile so as to create or otherwise provide a volume Bragg grating. The photosensitivity of the volume holographic recording medium 335 allows the interference pattern to generate a latent image inside the volume of the recording medium that can then be developed with thermal treatment.

The phase mask 320 (or optical element or optical device as explained herein) is configured to induce a desired beam transformation, as described above (e.g., to introduce a phase shift function) to a broadband light beam that is to be transformed. Although referred to in this example as a phase mask, the phase mask 320 may be any optical element or device with a specified profile of optical phase retardation across the aperture of the recording beam, which provides the desirable beam transformation. Another example would be an SLM. The desirable beam transformation occurs at the recording wavelength. The phase mask 320 can be created using any known method, such as using semiconductor techniques (lithography, etching, and/or deposition steps), spatial light modulators, recording in the volume of a photosensitive medium, etc., such that the desired beam transformation (e.g., phase profile) is achieved for the hologram recorded in the recording medium 335, i.e., a hologram of the phase profile, otherwise referred to as a phase profile, is embedded in the recorded VBG. The diffracted beam that is transmitted through the resulting optical device will bear the phase pattern contained in the phase mask. Furthermore, the phase profile embedded in the VBG induces the desired beam transformation for each spectral component within a spectral width of the VBG (and the phase profile is therefore achromatic within its spectral width). In other words, the phase mask information incorporated into the VBG provides the same phase incursion for all spectral components of the transformed beam if it is measured in number of wavelengths. Moreover, this phase incursion is equal to the phase incursion in the recording beam if measured in number of wavelengths, and the phase mask 320 provides the desirable phase profile at a wavelength of the recording light source. Therefore, the recorded holographic phase mask provides the same spatial transformation for the beam with a wide spectrum (i.e., the broadband beam) as that for a narrowband beam at a recording wavelength.

If the desired beam transformation, e.g., phase profile, is produced by spatial variations of refractive index, the phase mask 320 may be constructed from photosensitive material such as PTR glass. If the phase profile is produced by spatial variations of geometrical thickness, the phase mask 320 can be constructed from any material transparent at the wavelength of recording. The permanent phase mask could be replaced by a SLM that enables easier reconfiguration of the phase profile. Whether using a phase mask or SLM, this optical element that performs the phase transformation should provide such a phase profile at a recording wavelength that is required for transformation of the broadband light beam. The phase mask or SLM is a monochromatic element. Achromatization will appear in a diffracted beam after imprinting this phase profile in a VBG.

The holograms are recorded in a thick (volume) holographic recording medium, so any wavelength satisfying the Bragg condition, regardless of whether or not it is the recording wavelength, will be diffracted and have the same phase profile. In accordance with one embodiment, a center wavelength of the broadband light beam that is to be transformed is within a wavelength range of 325 nm to 2700 nm. The broadband volume hologram of a phase element is thus created via a holographic phase mask recorded within a VBG with a large period that corresponds to a small angle of deflection of a diffracted beam. This approach provides broadband operation of a phase mask determined by spectral acceptance of the VBG. When an incoming broadband beam satisfies the Bragg condition of the holographically recorded phase grating, the diffracted beam phase is changed accordingly by the phase information embedded in the volume grating and this occurs for the whole spectral bandwidth of the incoming beam. This technique removes the need of angular tuning of the volume grating or the addition of dispersive optical elements before or after the HPM. The Bragg condition is automatically met for all present wavelengths due to the broad wavelength acceptance of the HPM.

The resulting optical element created using the systems and methods described herein are useful in many applications, including ultrafast femtosecond laser systems. Due to the large spectral bandwidth of short pulses, it is difficult to manipulate the transverse mode structure of these light sources. The achromatic phase mask configurations described herein can be used to provide femtosecond transverse mode conversion from the fundamental mode $TEM_{00}$ to higher modes, including $TEM_{01}$, $TEM_{10}$, and $TEM_{11}$, or any other desirable beam distortions. The disclosed system is capable of providing the same quality phase transformation of a narrowband beam at a certain wavelength as a conventional phase mask, with the main difference being that a single HPM works for a very broad spectral range of broadband light beams.

Returning now to FIG. 3, system 300 may also optionally comprise an optical system 310 that includes one or more optical elements, such as beam expanders, beam shapers, focal lenses, beam collimators, reflectors, beam splitters, and scanners (e.g., a galvanometer). According to one embodiment, the optical system 310 includes at least one of a beam expander and a beam shaper. For instance, the beam expander may be used to adjust, e.g., enlarge, the beam size of a coherent laser beam to a predetermined value ideal for the beam shaper, which may be configured to convert a Gaussian intensity profile inherent to the coherent laser beam into a flat-top intensity profile.

Figure 4:
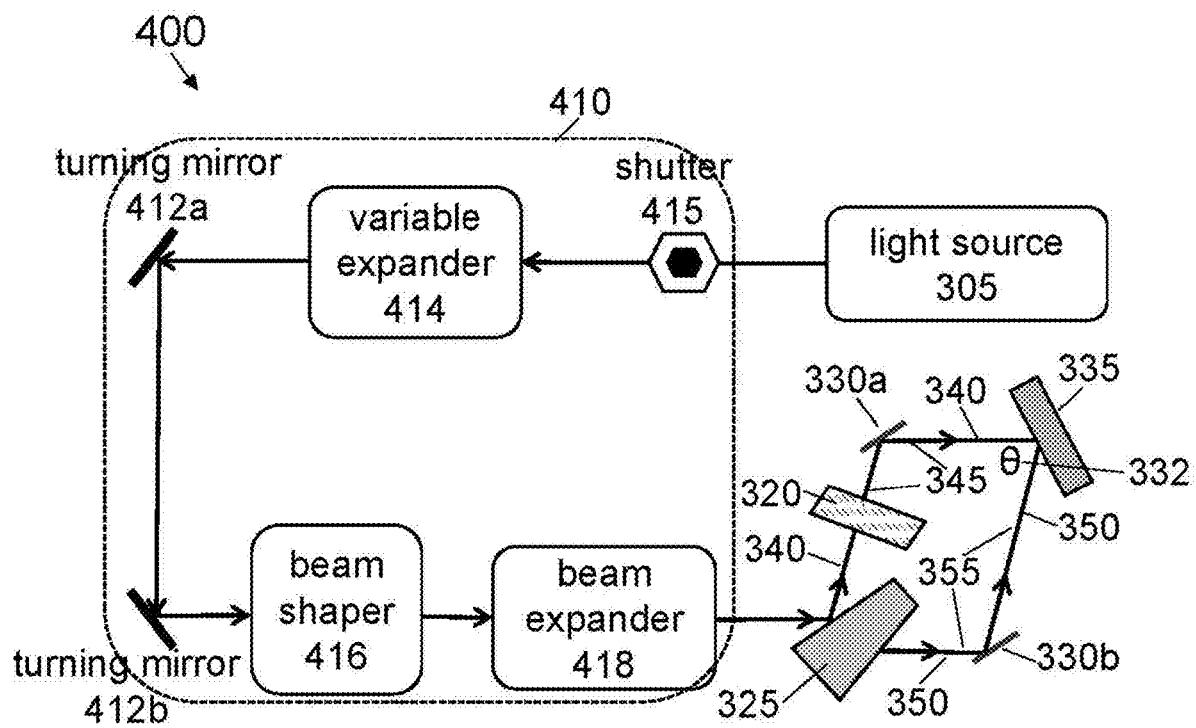
FIG. 4 is a schematic representation of another example of a system for recording an achromatic volume holographic phase mask in accordance with aspects of the invention.

FIG. 4 is a recording system 400 similar to that shown in FIG. 3 and includes one non-limiting example of an optical system 410 comprising optical components. For instance, the light source 305 may be a He—Cd laser emitting UV light at a wavelength of 325 nm, which is then passed through the optical system 410. A first beam expander 414 may be configured as a variable beam expander to enable the width (diameter) of the beam to be varied prior to sending the light beam through the beam shaper 416. A second beam expander 418 may also be included in optical system 410 for purposes of individually matching the size of the beam to apertures of various downstream components, such as the phase mask 320. A shutter 415 may also be included as part of the optical system 410 to control the exposing dosage onto the volume holographic recording medium 335. One or more reflectors, such as turning mirrors 412a and 412b, may also be included in optical system 410 for purposes of directing the light beam within the optical system 410.

The recording systems of FIGS. 3 and 4 are configured to generate a hologram of a phase mask that is imprinted or otherwise embedded in a long period transmitting VBG that is recorded in PTR glass or in other volume holographic mediums. The resulting HPM is achromatic within its spectral width. Being recorded in PTR glass, this hologram is a broadband phase element capable of use over a broad wavelength range at high instant and average power. Therefore, it can be used for broadband optical beam transformations and combining, conversion of modes in laser resonators, correcting aberrations in optical systems, and selecting beams with a specific phase profile.

EXAMPLES

Functions and advantages of the embodiments of the systems and techniques disclosed herein may be more fully understood based on the example described below. The following example is intended to illustrate various aspects of the disclosed achromatic HPMs, but is not intended to fully exemplify the full scope thereof.

Transverse Electromagnetic Mode (TEM)
Conversion with an Achromatic HPM

Figure 5:
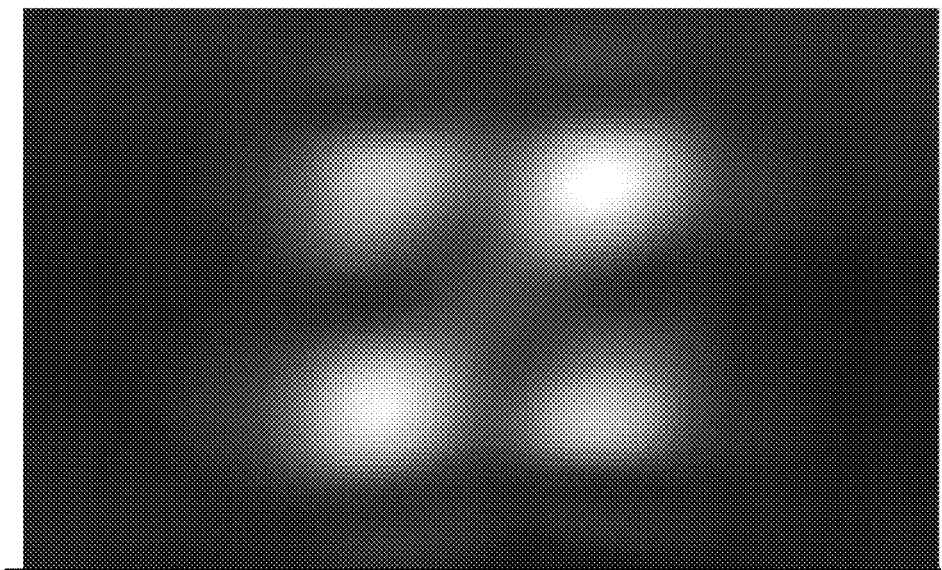
FIG. 5 shows a photo of a $TEM_{11}$ mode generated after a broadband Gaussian beam was diffracted by an achromatic volume holographic phase mask in accordance with aspects of the invention.
Figure 6:
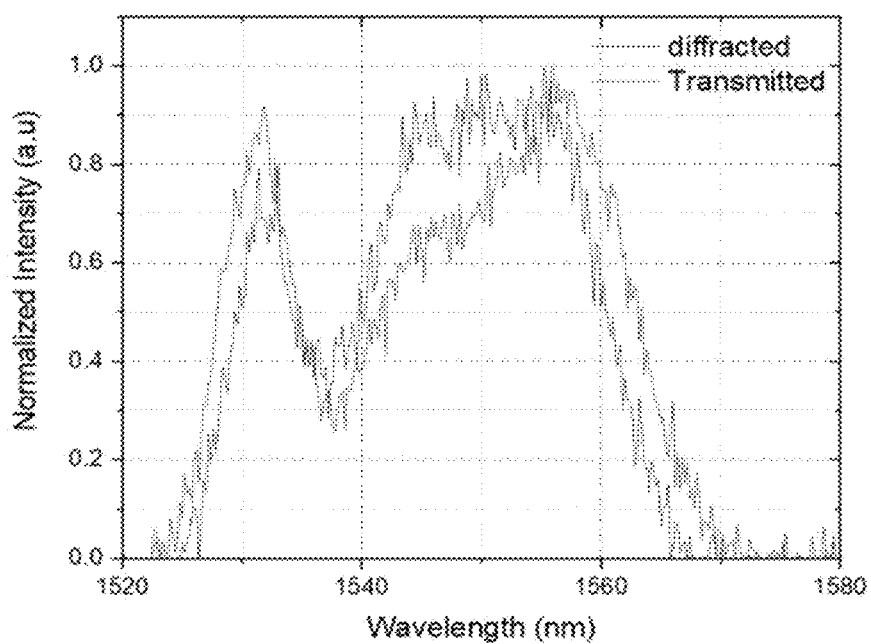
FIG. 6 shows a plot of spectra for the incident Gaussian beam and the diffracted beam of FIG. 5.

A recording system similar to the one shown in FIG. 4 and configured with a He—Cd laser light source operating at 325 nm was used to record an HPM using converging recording beams set at a half-angle of interference of 4°. The function of the HPM was to convert a broadband Gaussian laser beam to a $TEM_{11}$ mode without the need to angularly tune the HPM or use any additional dispersive elements. A broadband laser source operating in the 1550 nm region and having a spectral width of 40 nm was tested. The laser beam was collimated with a 6 mm collimator for purposes of providing full illumination of the HPM. FIG. 5 is a photograph showing the converted Gaussian broadband beam to $TEM_{11}$ mode after being diffracted by the HPM. To verify the broad spectral acceptance of the HPM, the converted beam spectrum was measured and is shown in FIG. 6 as a function of intensity versus wavelength. The original (incident) Gaussian beam spectrum is also shown in FIG. 6 for purposes of comparison. The results indicate that the phase conversion process did not reduce the spectral width of the beam. This is important because ultrashort pulse and high power CW lasers having broadband spectra are often used for medicine and material processing and detrimental effects can be experienced if the spectral properties of these light sources change during phase conversion. For instance, the pulse duration will change if the spectral properties of the ultrashort pulse are changed during phase conversion. In addition, significant power losses will occur if the spectral width of a laser source narrows during phase conversion.

This example demonstrated that broad wavelength acceptance of an HPM could be achieved with the disclosed method of recording a phase mask encoded VBG. Mode conversion from a Gaussian to a $TEM_{11}$ mode for a range of more than 40 nm was successfully achieved with a monolithic element and without any angular adjustments. It is to be appreciated that the efficiency of beam transformation does not depend on a particular phase pattern of the HPM and the demonstrated broadband acceptance can be implemented for any phase mask and wavefront distribution. In addition, mode conversion from a higher order mode to the fundamental mode is also possible with the disclosed systems and methods.

According to another example, an achromatic phase mask that consists of a holographically encoded phase profile inside of a VBG was created using a system similar to that shown in FIG. 4. Its spectral acceptance was approximately 30 nm, corresponding to the Bragg condition being met over this range without the need for angular tuning. This device was tested for mode conversion using several sources, including a femtosecond and a 1 kW CW fiber laser as well as a broadband ASE source. The resulting mode converted beams had the same bandwidth and did not suffer from spectral shaping. The overall diffraction efficiency of the achromatic phase mask was 94%.

The disclosed systems and methods relating to monolithic broadband HPMs are useful for a wide variety of applications that include the use of ultrashort pulse lasers and high power CW lasers that have broadband emission spectra, such as medical or material processing applications. Furthermore, near-diffraction-limited high-power laser beams with wide spectra can be produced by converting the undesirable higher order modes of large-mode-area fibers to the fundamental mode, and then combining them into a single high-power beam. In addition, the embodied apparatus can be employed as a multiplexer/demultiplexer. The disclosed broadband phase mask configuration can be used to further femtosecond beam shaping techniques, such as creating broadband holographic lenses.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls. Moreover, titles or subtitles may be used in the specification for the convenience of a reader, which shall have no influence on the scope of the present invention.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A method, comprising:
   selecting a period for a volume Bragg grating (VBG) such that a spectral selectivity of the VBG is at least as wide as a spectral width of a broadband light beam that is to be spatially transformed;
   selecting a desired beam transformation for the broadband light beam;
   passing a first light beam from a recording light source through an optical device to a volume holographic recording medium, the recording light source emitting light at a recording wavelength that is within a photosensitivity spectrum of the volume holographic recording medium, and the optical device configured to induce the desired beam transformation;
   directing a second light beam from the recording light source to the volume holographic recording medium; and
   converging the first light beam and the second beam at a recording angle such that:
      a spatial refractive index modulation profile is recorded in the volume holographic recording medium that provides the VBG with the selected period, and
      a phase profile is embedded in the VBG that induces the desired beam transformation for each spectral component within a spectral width of the VBG.

2. The method of claim 1, wherein the spectral width of the broadband light beam is at least 5 nm.

3. The method of claim 2, wherein the spectral selectivity of the VBG is wider than that of the broadband light beam.

4. The method of claim 1, wherein the desired beam transformation includes introducing a phase shift function.

5. The method of claim 4, wherein the phase shift function produces mode conversion.

6. The method of claim 1, further comprising splitting the recording light emitted from the light source into the first light beam and the second light beam.

7. The method of claim 6, further comprising deflecting the first and second light beams such that the first and second light beams converge at the recording angle.

8. The method of claim 1, wherein the optical device is configured to provide the desired beam transformation at the recording wavelength.

9. The method of claim 1, further comprising obtaining the optical device.

10. The method of claim 1, further comprising selecting a thickness for the VBG such that the spectral selectivity of the VBG is at least as wide as the spectral width of the broadband light beam.

11. An optical device created using the method of claim 1.

12. A system, comprising:
   a light source that emits a collimated recording light beam at a recording wavelength;

a beam splitter configured to split the recording light emitted from the light source into a first beam and a second beam, the first beam directed along a first beam path and the second beam directed along a second beam path;

an optical device disposed in the first beam path, the optical device configured to induce a desired beam transformation for a broadband light beam that is to be transformed;

at least one mirror configured to deflect at least one of the first and second light beams such that the first and second light beams converge at a recording angle; and a volume holographic recording medium having a photosensitivity to the recording wavelength and disposed at an intersection of the first and second beam paths, wherein the convergence of the first and second light beams records a spatial refractive index modulation profile in the volume holographic recording medium so as to create a volume Bragg grating (VBG) having a period such that a spectral selectivity of the VBG is at least as wide as a spectral width of the broadband light beam, and a phase profile is embedded in the VBG that induces the desired beam transformation for each spectral component within a spectral width of the VBG.

13. The system of claim 12, wherein the broadband spectral width is at least 5 nm.

14. The system of claim 13, wherein the spectral selectivity of the VBG is wider than that of the broadband light beam.

15. The system of claim 13, wherein a center wavelength of the broadband light beam is within a wavelength range of 325 nm to 2700 nm.

16. The system of claim 12, wherein the volume holographic recording medium is photo-thermo-refractive (PTR) glass.

17. The system of claim 12, wherein the broadband light beam has a center wavelength that is transparent to the volume holographic recording medium.

18. The system of claim 12, wherein the volume holographic recording medium is monolithic in structure.

19. The system of claim 18, wherein the volume holographic recording medium has a thickness such that the spectral selectivity of the VBG is at least as wide as the spectral width of the broadband light beam.

20. A method of hologram recording, comprising:
selecting a period and thickness for a volume Bragg grating (VBG) such that a spectral selectivity of the VBG is at least as wide as a spectral width of a broadband light beam that is to be spatially transformed;

selecting a desired beam transformation and corresponding phase profile across an aperture for the broadband light beam;

selecting a recording light source emitting light at a recording wavelength that is within a photosensitivity spectrum of a volume holographic recording medium;

designing and fabricating a phase mask or spatial light modulator that provides a desirable phase profile at a wavelength of a recording light source;

splitting a beam from the recording light source into two recording beams;

aligning a hologram recording system to provide a convergence angle between the two recording beams that provides the selected period of the VBG;

passing a first recording light beam from the recording light source through a phase mask or a spatial light modulator to a volume holographic recording medium to create a first light beam path with the desirable phase profile across the aperture;

directing a second recording light beam from the recording light source to the volume holographic recording medium to create a second light beam path; and converging the first light beam and the second beam at the convergence angle such that:
a spatial refractive index modulation profile is recorded in the volume holographic recording medium that provides the VBG with the selected period, and a phase profile is embedded in the beam diffracted by the VBG that induces the desired beam transformation, which is identical for each spectral component of the broadband beam within the broadband spectral width of the VBG.

* * * * *